Dec. 20, 1966  F. E. BUSCHBOM ET AL  3,292,587
SELF-DUMPING BUNK FEEDER CONVEYOR
Filed July 13, 1964  7 Sheets-Sheet 1

INVENTORS
FLOYD E. BUSCHBOM
GLEN D. HANSEN
BY
Moore White & Bud
ATTORNEYS

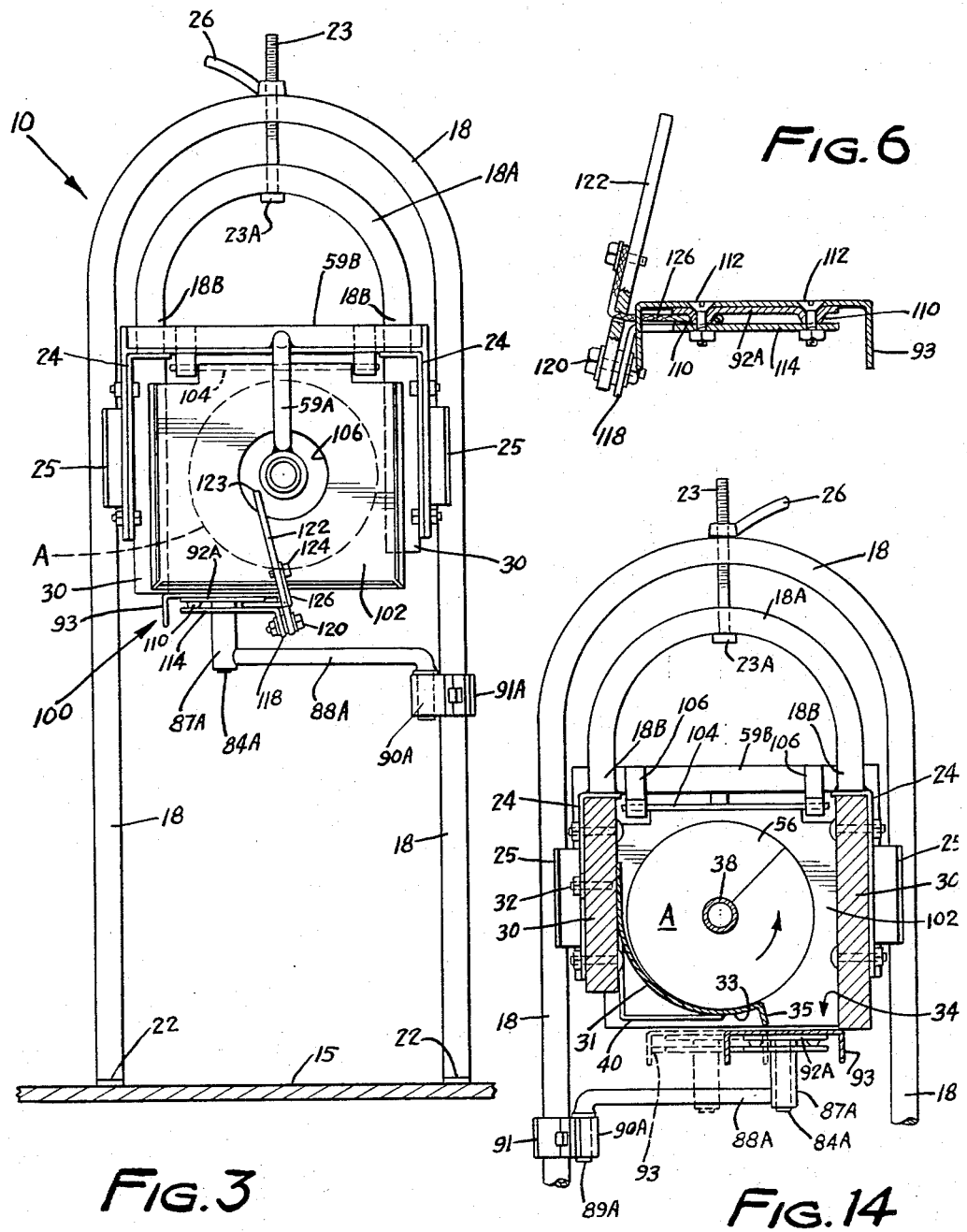

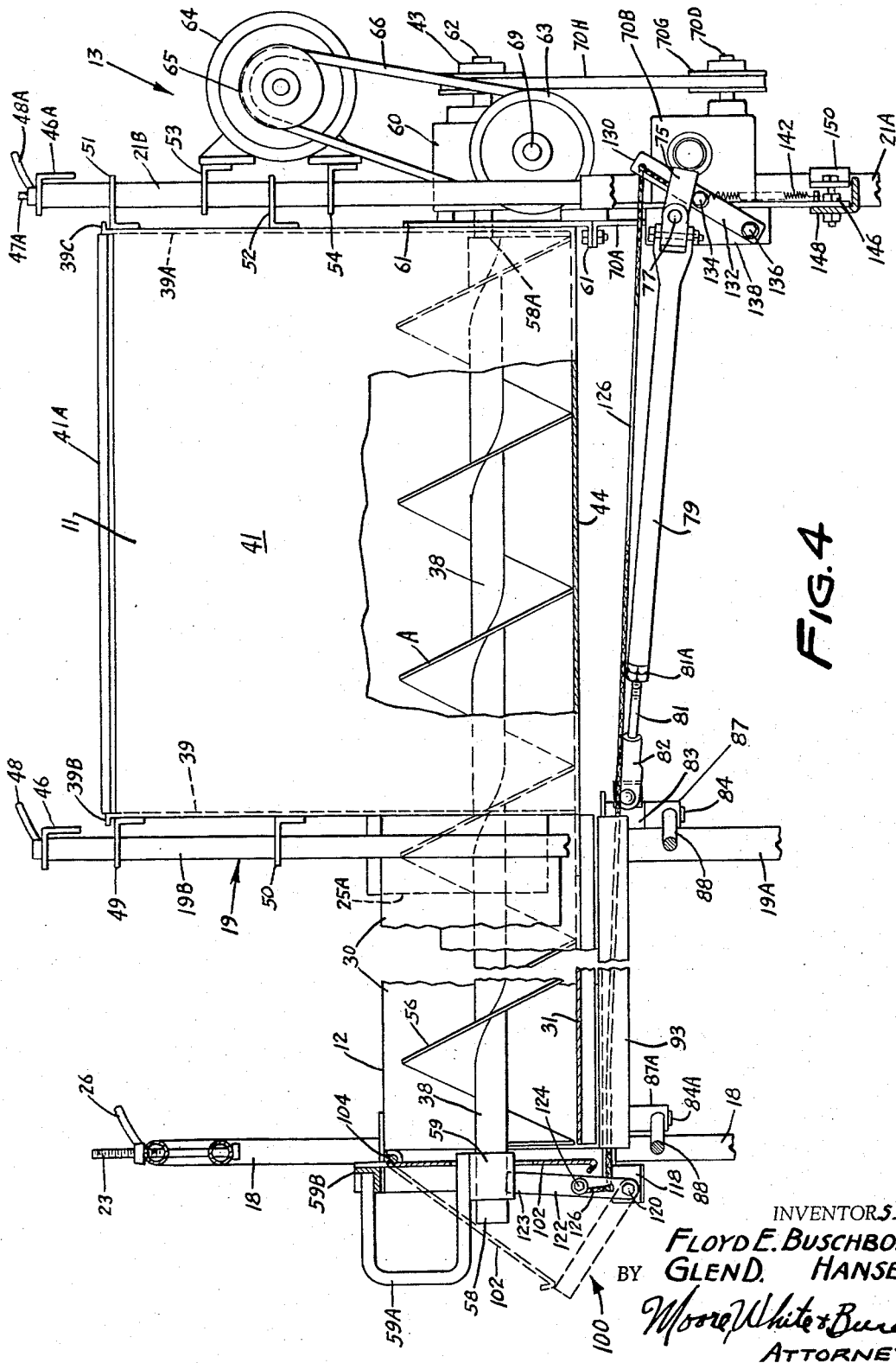

Dec. 20, 1966  F. E. BUSCHBOM ET AL  3,292,587
SELF-DUMPING BUNK FEEDER CONVEYOR
Filed July 13, 1964  7 Sheets-Sheet 5
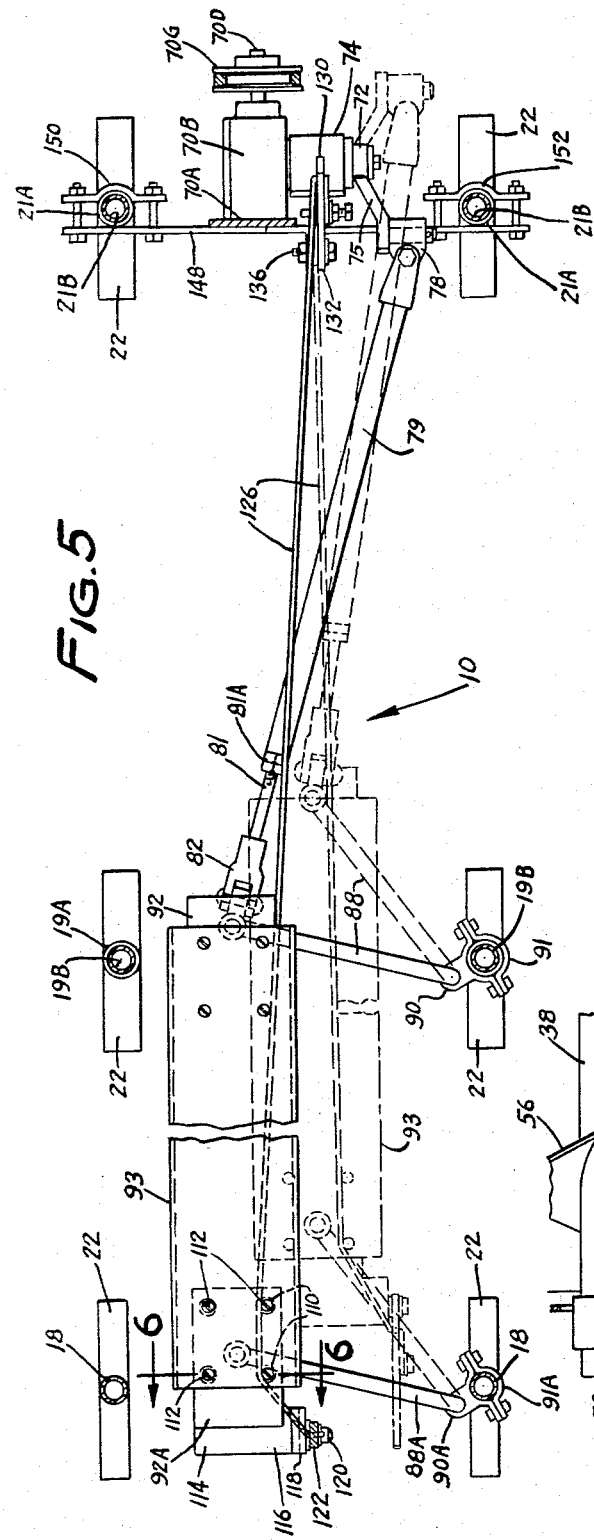
INVENTORS
FLOYD E. BUSCHBOM
BY GLEN D. HANSEN
Moore, White & Burd
ATTORNEYS Dec. 20, 1966 F. E. BUSCHBOM ET AL 3,292,587
SELF-DUMPING BUNK FEEDER CONVEYOR
Filed July 13, 1964 7 Sheets-Sheet 6

INVENTORS
FLOYD E. BUSCHBOM
BY GLEN D. HANSEN

Moore, White & Burd
ATTORNEYS

Dec. 20, 1966 F. E. BUSCHBOM ET AL 3,292,587
SELF-DUMPING BUNK FEEDER CONVEYOR
Filed July 13, 1964 7 Sheets-Sheet 7

INVENTORS
FLOYD E. BUSCHBOM
BY GLEN D. HANSEN
Moore, White & Burd
ATTORNEYS

United States Patent Office
3,292,587
Patented Dec. 20, 1966

3,292,587
SELF-DUMPING BUNK FEEDER CONVEYOR
Floyd E. Buschbom, Long Lake, and Glen D. Hansen,
Maple Plain, Minn., assignors to Van Dale Corporation, Wayzata, Minn., a corporation of Minnesota
Filed July 13, 1964, Ser. No. 382,223
18 Claims. (Cl. 119—56)

The present invention relates to materials conveying and handling equipment and more particularly to an improved bunk feeder assembly or the like of the type used for conveying livestock feeds such as ensilage into longitudinal extension over a feed bunk and then depositing, dumping or releasing the feed into the bunk throughout its length all at once to make it available to farm animals. It is a feature of the invention that the drive mechanism of the dumping device is clutch controlled. By use of the clutch, the driving mechanism may remain stationary until dumping is initiated. At that time, feed is released for the animals spaced from the dumping mechanism which leads the animals away from possible contact and injury by the moving parts. The clutch is initially engaged by the action of a trip lever that is mounted on the dumping mechanism and moves with it as the dumping cycle is carried out. The completion of a dumping cycle resets the trip lever for the next cycle. The present invention is also novel in using mechanical linkage for initiating the dumping mechanism action.

It is a general object of the present invention to provide an improved bunk feeder assembly which is rugged in construction, reliable in operation and can be manufactured at a relatively low cost.

Another object of the present invention is the provision of a reliable bunk feeder assembly.

A further object of the present invention is the provision of an improved bunk feeder assembly including a clutch and mechanical actuating mechanism for delivering feed material to the entire length of a feed bunk or the like at one time.

It is an object of this invention also to provide a bunk feeder assembly in which a conveyor having a portion that is opened and closed in a cycle initiated by the filling of the conveyor structure is controlled in part by the movement of the mechanism opening and closing said portion.

It is yet another object of this invention to provide a bunk feeder assembly in which a reciprocating closure means closes a portion of a conveyor until the conveyor is filled and is then opened and the drive means for the closure is controlled at least in part by a lever secured to the closure and moved with it toward a clutch means and then away from it.

Yet another object of the present invention is the provision of an improved bunk feeder assembly including a driving means, a dumping means, a mechanical clutch means selectively disconnecting and interconnecting the driving means and the dumping means, a movable pressure sensing means associated with the conveyor and a mechanical connection between the sensing means and the clutch means for engaging the clutch when feed material is forced by the conveyor against the pressure sensing means.

A further object of the invention is the provision of an improved ensilage conveyor and feed bunk filler including a hopper, a horizontally disposed auger conveyor and feed support portion closed by a movable closure member to provide a controlled egress means, a drive motor, a clutch including an engaging lever, a pressure sensing plate at the end of the conveyor opposite from the hopper, trip lever mounted on the closure and operatively associated with the pressure plate, a force transmitting means mechanically connected between the trip lever and the clutch engaging lever to engage said clutch and thereby connect said drive motor to the mechanism for moving the closure member to an open position whereby the feed material within the conveyor is dumped into the feed bunk.

Still a further object of this invention is to provide a new and useful bunk feeder or the like having means for accurately measuring feed by volume.

It is a further object of this invention to provide a bunk feeder assembly in which feed is dumped all at once along the entire length of the bunk by a mechanism that minimizes the hazards of accidental injury to animals by contact with moving parts.

It is another object of this invention to provide a means for conveying feed into extended position out of reach of the animals to be fed and then dumping it in extended condition in which the dumping mechanism connecting rod or pitman remains stationary until dumping is initiated.

A further object of this invention resides in the provision of a conveyor system that will deliver animal feed in a somewhat greater extension than the length of the conveyor.

It is a still further object of this invention to provide a bunk feeder assembly in which a control member on a movable part and one on a stationary part are interconnected by an elongated member of fixed operative length under tension but which can yield under compression.

It is an additional object of this invention to provide a bunk feeder assembly incorporating a clutch structure that can be engaged by a single impulse and thereafter will remain engaged to execute one cycle and automatically disengage.

It is another object of this invention to provide a bunk feeder assembly including a clutch structure in which concentric sleeves are secured together and released by releasing or holding against rotation the outer sleeve respectively.

A still further object of this invention is to provide a bunk feeder assembly including a clutch mechanism that is supported by the drive shaft it serves.

Yet another object of this invention is to provide a bunk feeder assembly including a clutch mechanism that is cylindrical and concentric with the drive and driven shafts it serves.

Other and further objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIGURE 3 is an end elevational view of the apparatus of FIGURE 1 drawn to the scale of FIGURE 2 and taken on the line and in the direction of the arrows 3—3;

FIGURE 4 is a side elevational view partly broken away showing the connection between the closure operating means and the pressure plate on the same scale as FIGURE 3; hidden and adjusted parts are shown in broken lines; repetitive portions of the device have been omitted to conserve space;

FIGURE 5 is a partial bottom view of the apparatus with broken lines showing the clutch and closure members in an alternate position; the scale is that of FIGURE 4;

FIGURE 6 is a partial transverse sectional view taken on the line and in the direction of arrows 6—6 of FIGURE 5 and drawn to a larger scale than that figure;

FIGURE 7 is a partial vertical longitudinal sectional view of the apparatus with the closure member in the position illustrated in FIGURE 5 in broken lines; it is drawn to the scale of FIGURE 5; broken lines show hidden parts;

FIGURE 14 is a cross-sectional view taken on the line and in the direction of the arrows 14—14 of FIGURE 1; it is drawn to the same scale as FIGURE 2.

Figure 1:
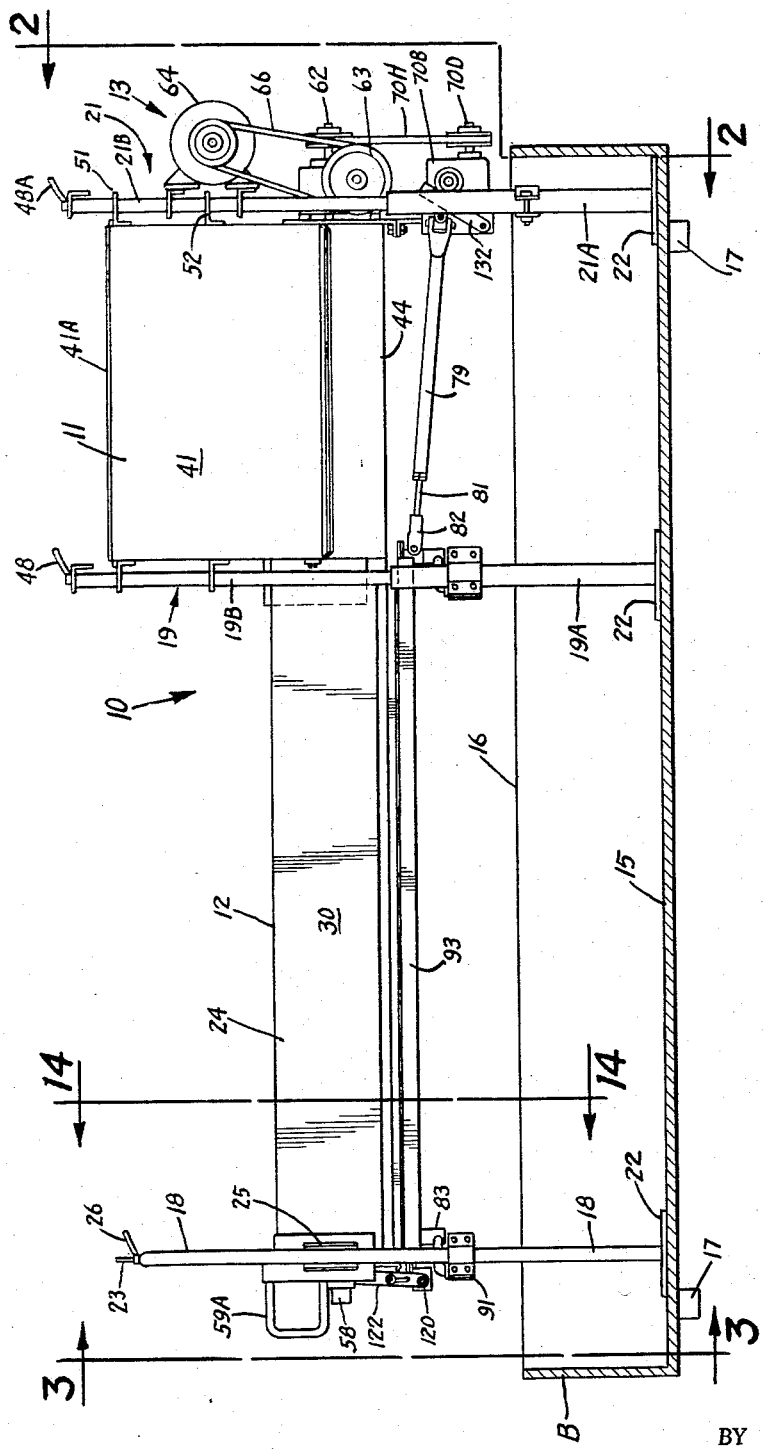
FIGURE 1 is a side elevational view of the invention installed in a feed bunk shown in longitudinal vertical section.
Figure 2:
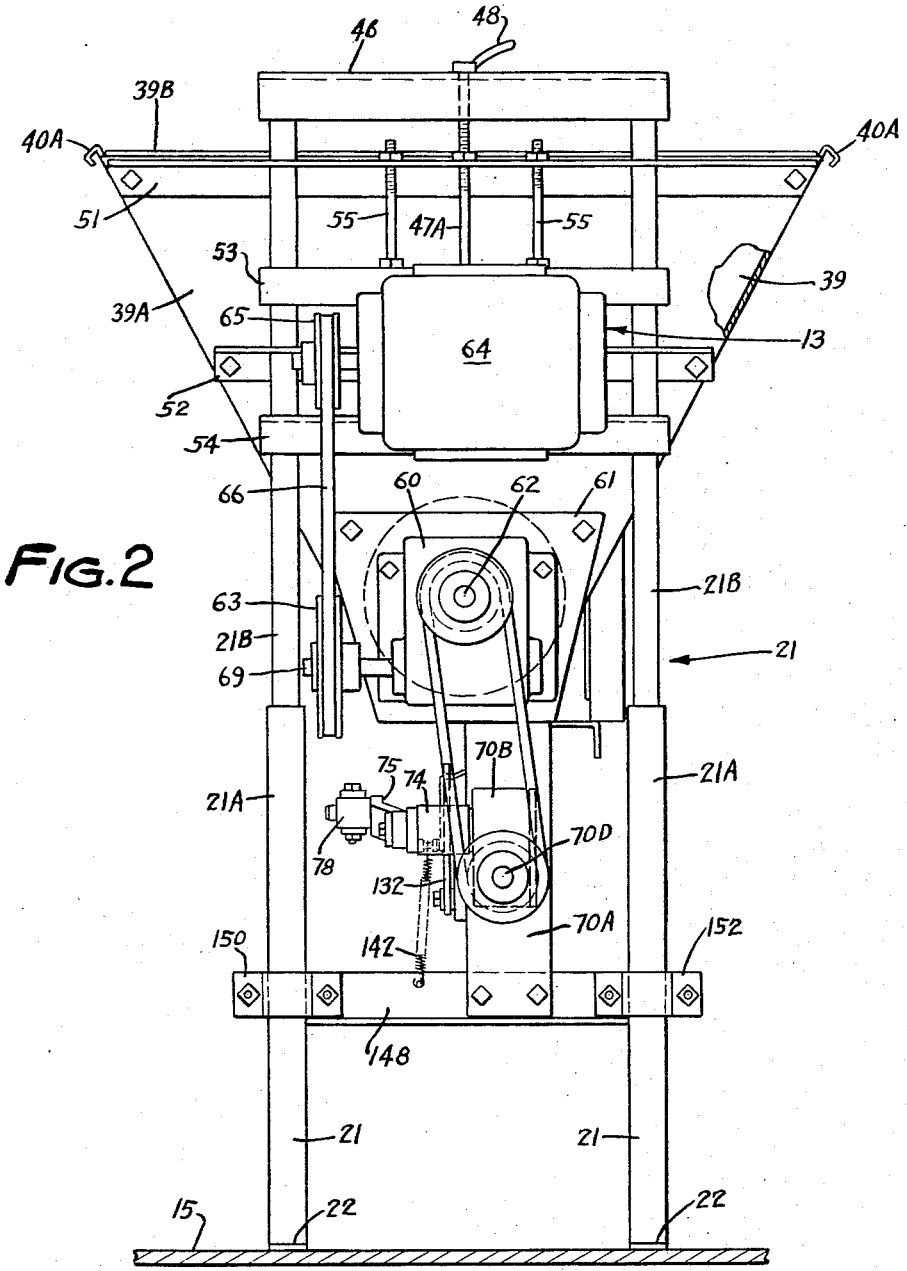
FIGURE 2 is an enlarged end elevational view of the apparatus of FIGURE 1 taken on the line and in the direction of arrows 2—2.

Reference is now made to the drawings and specifically to FIGURES 1, 2 and 3. There is shown the bunk feeder or the like of this invention generally designated 10, including the following generally designated components: a hopper assembly 11, a feed conveyor and supporting assembly 12 and a drive assembly 13. All of these are positioned in the bunk B (FIGURE 1) which is supported by a plurality of legs 17 secured to and supporting a floor o rbase 15 having a peripheral wall 16, the nearest portion of which is removed for illustration. The bunk is usually made of wood, although it may be constructed partially or completely of concrete, steel or the like, as desired. The entire feeder 10 is supported on a plurality of support stands 18, 19 and 21, each of which provides a pair of legs the latter two comprised of telescoping leg portions 19A and 19B and 21A and 21B to be described hereinbelow. Flat foot plates or flanges 22 are bolted or otherwise secured to and which rest on and are supported by the floor 15 of the bunk.

The stand 18 includes spaced parallel tubular legs interposed by a semi-circular portion integral therewith as shown in FIGURES 1 and 3. It is thus of inverted U-configuration and formed from a tubular pipe member as shown.

The upright U-shaped member 18 cooperates with a similarly shaped rigid member 18A which is spaced inwardly due to its smaller design but in the vertical plane of member 18, the straight portions thereof providing inward supporting legs 18B. The base of legs 18 are secured to an opposed pair of inverted L-members 24 by a weld or similar means. Inverted L-members 24 are in turn provided with channel guide flange members 25 which being secured to the outside surface of the L-members are thereby interposed between the inverted L-members 24 and supporting legs 18. The guide members 25 are slidable upon legs 18 and provide a positioning means and lateral supporting means for inverted L-members 24 and inner U-shaped member 18A connected thereto.

The U-shaped members 18 and 18A are apertured to receive the bolt member 23 which is rigidly fastened at its lower end 23A to U-shaped member 18A but slidably received by the aperture in 18 and is threaded at its upper end to receive threaded handle 26. There is thus provided means for adjusting the vertical position of U-shaped member 18A relative to U-shaped member 18.

By manually adjusting the bolt member 23, the operator is able to adjust the vertical height of the channel structure including side members 30, L-members 24, guide flanges 25, and trough member 31 relative to the bunk B. This is advantageous when installing the bunk feeder assembly as the bunk B is likely to have an uneven floor which can be compensated for by use of the structure just described.

Inverted L-members 24 are secured to and support an opposed pair of longitudinally extending wooden side members 30 which form part of the trough assembly or elongated structure for supporting conveyed feed. The elongated conveyed feed supporting structure includes side members 30 and J-shaped, feed supporting, trough member 31 secured by its straight vertical portion to side 30 by bolts 32, as shown in FIGURE 14. J-shaped trough member 31 is further supported by a series of rigid angle bars 40 which underlie the trough member at intervals as is needed and secured thereto by a weld. The angle bars 40 are adapted to be secured by well known means to the wooden side members 30.

Adjoining the straight back portion is the arcuate portion of the trough member that is generally semi-circular and includes a linearly extending edge 33 which is spaced a distance from the other side member 30 on the right as seen in FIGURE 14. The termination of inverted J-shaped trough member 31 short of one of the sides 30 provides a longitudinally extending slot opening or egress means 34 through which feed material moves at substantially right angles to its conveyed direction, into bunk B. There is optionally provided a downwardly projecting lip flange 34 adjoining edge 33 and extending linearly therewith to provide means for guiding the ensilage to the underlying bunk B and also give strength to trough member 31.

In operation, the ensilage or material is commonly conveyed along the trough assembly into a linearly extended position by an auger labelled A comprising helical flighting 56 connected to shafts such as 38 which are driven by the drive means 13. Conveyors and drive means of this general type are well known in the art as shown by United States Patent 2,981,402 incorporated herein by reference.

The arcuate portion of the trough member 31 supports the auger A. By driving the auger A in a counterclockwise direction, as shown in FIGURE 14, the outer periphery of the helical members 56 will bear toward the straight back portion of the trough member and provide a horizontal thrust to the left which is absorbed substantially by the member 31, side member 30 supporting member 31. This produces a climbing action by auger A and prevents the conveyor from bearing against the other side member 30 on the right.

As shown in FIGURE 1, the hopper generally designated 11 has a sheet metal end plate 39, a second corresponding end plate 39A, each of generally inverted triangular configuration and each having an outwardly flanged top edge 39B and 39C, respectively. A semi-circular portion is cut out at the downwardly turned apex of the triangle comprising end plate 39 to receive auger A. Side panels 41 are joined to the end plates by being bolted along inwardly turned flanged edges and are provided with outwardly turned top flanges or edges 41A. Bottom member 44 is bolted to side panels 41 so that bottom member 44, a semi-circular trough member, forms a bottom for the hopper 11. Member 44 extends to and abuts against the bottom of the first trough 31 to form a continuation thereof, as shown in FIGURE 4. Thus, it will be apparent that the auger A is supported in part by the trough 31 and in part by bottom 44 of the hopper 11.

Hopper 11 is supported on stands 19 and 21 comprising lower leg portions 19A and 21A, respectively, having feet 22 like those of stand 18 and hence given the same number. Telescopically received within leg portions 19A and 21A are upper leg portions 19B and 21B, respectively, which are connected at their tops by transverse cross angles 46 and 46A which are suitably secured as by welding to the top ends of the vertical tubular leg portions 19B and 21B. Vertical adjustment of stands 19 and 21 and thus of hopper 11 is provided by telescoping leg portions 19B and 21B more-or-less into portions 19A and 21A where they are secured by conventional set screws.

End plate 39 of hopper 11 has suitably secured thereto a pair of angles 49 and 50 which are appropriately apertured to receive the legs of stand 19 for relative vertical sliding motion. A threaded rod 47A is secured at one end to handle 48, passes through an aperture in angle 46 and through a nut secured to the under surface of angle 49. Handle 48 engages the top surface of angle 46, as shown. Some additional vertical adjustment of the left end of hopper 11 in FIGURE 4 is thus provided to permit elevating the hopper end consistent with the elevation to which the conveyor is adjusted.

Wall 39A is provided with a pair of angle members 51 and 52, in similar fashion to angles 49 and 50 for end plate 39. Another threaded rod 47A is welded at one end to handle 48A which engages the top surface of angle member 46A of stand 21. Angle 51 is appropriately apertured for the penetration of rod 47A and rod 47A penetrates a nut secured to the under side thereof. Angles 51 and 52 are appropriately apertured for the penetration of the vertical leg portions 21B. Some vertical adjustment of the right end of hopper 11 is achieved by turning handle 48A also for leveling purposes.

Another pair of angles 53 and 54 are apertured and positioned on the leg portions 21B of hanger 21 and serve as a motor base. Angles 53 and 54 are each turned in the opposite direction from angles 50 and 51 to provide an outwardly turned flat surface having an elongated slot in which the base of the motor 64 is bolted.

As shown in FIGURE 2, the angles 53 and 54 are appropriately apertured for the passage of the leg portions 21B and adjustable upwardly and downwardly vertically thereon. Angles 53 and 54 are maintained in spaced relation by being fixedly secured to the motor. Angle 53 has a pair of threaded rods 55 each welded or otherwise secured at one end thereto and penetrating appropriate apertures in angle 51. Angle 53, and hence motor 64, are held in vertical adjustment with respect to angle 51 by a nut positioned on each rod 55 above the flange of angle 51. This structure suitably positions the motor 64 to maintain belt tension of a belt 66. The motor moves upwardly or downwardly with the hopper assembly 11 as it is vertically adjusted by handles 48 and 48A turning rods 47 and 47A to produce a fine adjustment after an appropriate adjustment has been made by sliding leg portions 19B and 21B with reference to lower portions 19A and 21A respectively.

Referring now to FIGURES 2 and 4, the auger or helical flight means A, supported by the trough 31 and hopper bottom 44, comprises a helical flight 56 secured to a tubular center shaft 38, also seen in FIGURE 7. When a plurality of sections are employed, adjacent sections may be abutted and secured together, not part of this invention per se and hence neither shown nor described herein.

Auger A is provided with a distal terminal end 58. A sleeve bearing 59 is mounted over the distal end of the shaft 38 which rotates therein. The sleeve bearing 59 is itself supported by means of a U-shaped support bracket 59A, including a pair of parallel longitudinally extending legs and a vertically disposed connecting leg which is disposed in spaced relationship from the end of the conveyor. The upward end of the support 59A is rigidly secured in any suitable manner as by welding to a cross member 59B. The cross member 59B is in turn rigidly secured at each end to the tube 18A.

Shaft 38 has also a proximal terminal end 58A which is secured to one end of an output shaft 62 of a fixed ratio speed reducing gear box or transmission 60. Gear box 60, as perhaps shown best in FIGURES 2 and 4, is suitably fixed as by bolting upon a flat plate 61 suitably secured as by bolting to wall 39A. Box 60 has the shaft 62 extending from both ends thereof, one end being secured to shaft 38 of auger A as previously described and the other end being provided with sheave 43. Motor 64 has a shaft upon which is mounted a sheave 65 upon which is entrained a belt 66 which in turn drives sheave 63. The sheave 63 is secured to and in turn drives the input shaft 69 of gear box 60. Thus, the running of the motor 64 drives the input shaft 69 and, through the gear box 60 the output shaft 62 for the rotation of the auger A.

Plate 61 has an inwardly turned bottom flange to which is secured the corresponding inwardly turned top flange of a plate 70A that supports a second gear box or transmission 70B which is bolted to plate 70A as to be vertically adjustable in any well-known manner. The lower end of plate 70A is secured to and supported by member 148 which is secured to leg members 21A by brackets 150 and 152, as seen in FIGURES 4 and 5. As shown in FIGURES 2, 4, 8, 9 and 10, transmission 70B has an input shaft 70D and an output shaft 71A connected to input shaft 70D through an appropriate worm and worm gear (not shown). Shaft 70D is driven by the sheave 70G from belt 70H reeved also over sheave 43 secured to shaft 62 of gear box 60 that is driven by motor 64 as described above.

Figure 10:
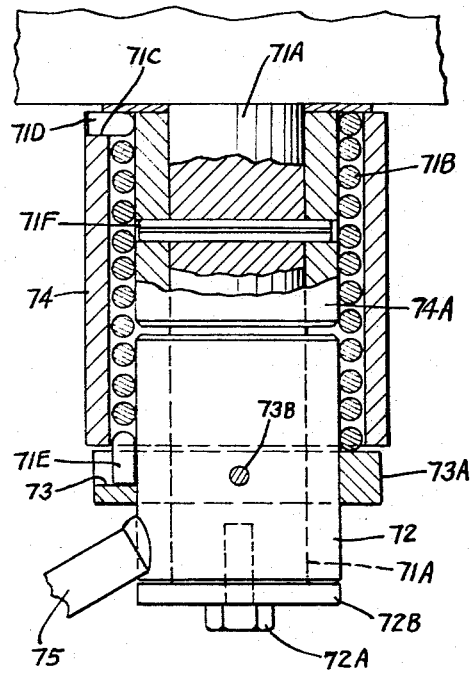
FIGURE 10 is a horizontal cross-sectional view of the clutch drawn to a larger scale than FIGURES 6, 8 and 9; broken lines show hidden parts.
Figure 8:
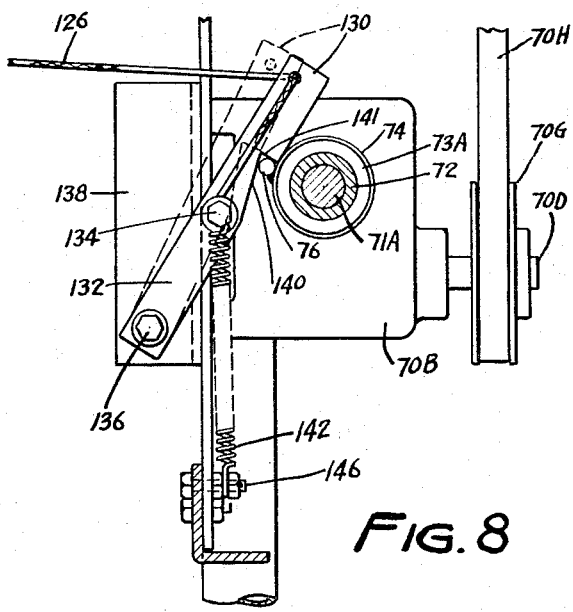
FIGURE 8 is a side elevational view of the clutch mechanism and associated structure drawn to the same scale as FIGURE 6; broken lines show hidden parts.
Figure 9:
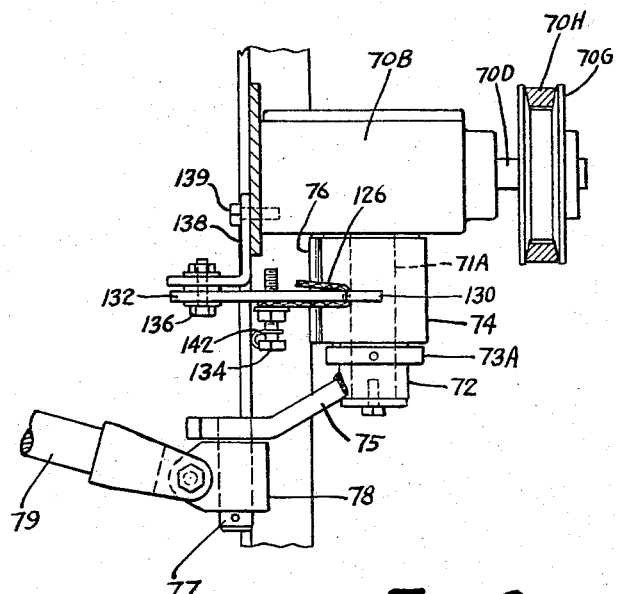
FIGURE 9 is a plan view of the clutch mechanism and associated structure drawn to the scale used in FIGURES 6 and 8.

As can be best seen in FIGURES 8, 9 and 10, a helical spring 71B is mounted upon an output shaft 71A of gear box 70B. The helical spring 71B has an outwardly turned portion 71D which extends into a radially extending recess 71C in an outer sleeve 74 mounted over spring 71B. Between spring 71B and the shaft 71A is a sleeve 74A which is secured against rotation upon shaft 71A by suitable means such as a roll pin 71F. Mounted for rotation upon the outward end of shaft 71A is a sleeve 72 which has the same thickness as well as inside and outside diameters as the sleeve 74A. The outermost end of the spring 71B includes a longitudinally projecting extension 71E positioned to extend inside a recess 73 within a lock ring 73A, the latter being secured to the sleeve 72 by means of a set screw 73B. The sleeve 72 is held against longitudinal displacement upon the end of the shaft 71A by means of a bolt 72A and a washer 72B.

The spring 71B is wound in the direction of rotation of the shaft 71A proceeding toward its free end and is tightly wrapped around the sleeves 74A and 72 thereby connecting the shaft 71A and sleeve 74A with the sleeve 72. When, however, the outer sleeve 74 is held against rotation with the shaft 71A, the coils of the spring will expand which releases the sleeve 74A allowing it to turn separately from sleeve 72. As can be clearly seen in FIGURES 8 and 9, there is rigidly mounted as by welding upon the outside of the sleeve 74 a longitudinally extending dog or rod 76. This dog 76 may be engaged in a predetermined pattern by structure to be described subsequently.

A crank arm 75 is rigidly secured to sleeve 72 and is provided with a pin 77 on which is rotatably mounted a tubular member 78, the latter being retained in position by a suitable fastener such as a cotter key. Member 78 has an apertured tongue which receives a pin or bolt assembly securing the bifurcated end of a pitman arm 79 for pivotal movement thereto as shown in FIGURES 4 and 9. Pitman arm 79 is tubular and has an inside diameter slightly larger than the outside diameter of a rod 81 which is telescopically received therein, and secured in a desired adjustment by lock nuts 81A, as shown in FIGURE 5.

Still with reference to FIGURES 4, 5 and 7, rod 81 has secured to its extending end a bifurcated member 82 suitably secured for pivotal movement to the tongue of sleeve 83 positioned for pivotal movement on shaft 84 and retained thereon in any suitable manner. A sleeve 87 is also positioned on shaft 84 and has secured thereto an arm 88 having a downturned end 89 supported for pivotal movement by bearing 90 of bracket assembly 91. Bracket assembly 91 is made into hermimorphic portions and adapted to be positioned around one of the legs of stand 19 and bolted thereto. The downturned end 89 may have a shoulder portion 89B resting on the top face of sleeve 90. The shaft 84 is secured to a plate member 92, in turn suitably secured as by bolting to the underside of a gate or closure member 93.

Gate member 93 is an elongated rectangular plate member having downwardly turned edges which may be hemmed for additional strength as desired. The plate member 92 is bolted thereto and projects somewhat toward the drive 13, as shown in FIGURE 7. Gate member 93 is usually provided for each section of auger, and a plurality of auger sections can be used as previously described.

Plate 92 at the distal end of the closure 93 is provided with a shaft 84A which is shorter than shaft 84, as shown in FIGURES 5 and 7, since the shaft 84A receives only sleeve 87A secured to arm 88A supported in the bearing 90A of bracket 91A which is secured to stand 18 in a manner comparable to bracket 91 on leg 19A of stand 19. Arms 88 and 88A are adapted to support the closure member 93 in a horizontal position yet allowing it to move from the position shown in solid lines in FIGURE 5 to the broken line position of that figure when driven by pitman 79 and back again to its original position.

Refer now particularly to FIGURES 3, 4, 6, 8 and 9 which illustrates a preferred form of clutch actuating mechanism in accordance with the present invention. The clutch actuating mechanism is indicated generally at 100 and includes a pressure sensing means including plate 102 mounted for pivotal movement upon a horizontal axis by means of a rod 104 affixed between a pair of downwardly extending supports 106 which are in turn secured to the cross member 59B. Member 59B is rigidly secured to member 18A as described above. The pressure sensing plate 102 is positioned at the distal end 58 of the auger A and is provided with a central bore 105 adapted to fit concentrically over the sleeve 59 and support 59A. Gate 93 and plate 102 are both movable wall portions, in effect, covering openings in the feed conveying and supporting structure which allow feed to be discharged into bunk B when they are moved from their respective openings.

As clearly shown in FIGURES 3, 5 and 6, the plate 92A, which is otherwise like plates 92, is provided with four laterally spaced apart downwardly displaced bosses 110 each of which receives a fastener such as a screw 112 to secure plate 114 to plate 92A but spaced therefrom a distance equal to the height of the bosses 110. Plate 114 has an extending portion 116 (FIGURE 5) with a laterally and downwardly extending inclined lip 118. The plate 114 is suitably cut away at its center to provide an opening for the sleeve 87A to extend therethrough.

Mounted for hinged movement upon the lower end of the lip 118 and secured thereto by means of a bolt 120 is an upwardly extending inclined trip lever 122 which normally rests adjacent to the outward surface of the pressure sensing plate 102 as shown in FIGURE 4. Lever 122 is thus inclined so that the upper end thereof 123 will not contact the sleeve 59. Secured to the trip lever 122 by suitable means as a bolt 124 is an elongated force transmitting member such as cable 126 which extends between the plates 92 and 114, and below the closure member 93 to a clutch control lever 132. The cable 126 is suitably secured to the lever 132 as for example bolt 134. The lower end of the lever 132 is pivotally secured as by a bolt 136 to a bracket 138 which is secured by suitable fasteners such as cap screw 139 (FIGURE 9) to the base of the transmission 70B.

The lever 132, as best seen in FIGURE 8, provides a cooperating engaging means such as a recess 140 including a wall portion 141 positioned along the line extending radially from the center of the shaft 71A. Extending downwardly from bolt 134 is a spring 142 the lower end of which is secured by means of a suitable fastener such as a bolt 146 to any suitable anchor such as member 148 secured between the legs 21A as described above. Wall portion 141 of lever 132 cooperatively engages dog 76 of sleeve 74 when the lever is in the position shown in solid lines in FIGURE 8 which is the position to which spring 142 urges lever 132. Cable 126 pulls lever 132 to the broken line position of FIGURE 8 when trip lever 122 is actuated which frees sleeve 74 for rotation.

When feed material is forced to the distal end 58 of the auger A by auger rotation, the pressure sensing plate 102 will eventually swing outwardly or toward the left as shown in broken lines in FIGURE 4, thereby moving the trip lever 122 to the broken line position. This action of lever 122 pulls on cable 126 and causes the lever 132 to move to the broken line position of FIGURE 8. Thereupon, spring 71B grips the sleeve 74A and thus engages the shaft 71A with sleeve 72. Crank arm 75 will then be driven and, via pitman 79, pull the closure member 93 toward the hopper 11. Closure member 93 carries with it the trip lever 122 which is mounted on closure member 93 as described above. As the closure member 93 moves further toward the hopper, the cable 126 will become slack and the trip lever 122 will assume an almost horizontal position, as clearly shown in FIGURE 7. With the tension on the cable 126 slackened, spring 142 will force the lever 132 back to the position shown in solid lines in FIGURE 8 so that the portion 141 of lever 132 is abutting the sleeve 74. Dog 76 will engage the wall 141 of the recess 140 as sleeve 74 completes one revolution which holds spring end 71D stationary. Inertia in the closure assembly will apply a force to spring end 71E which will tend to unwind spring 71B and thus release sleeve 74A and effect a disengagement of shaft 71A and sleeve 72. Thus, a cycle comprising one complete revolution of crank 75 is made. As seen most clearly in FIGURE 5, crank 75 is substantially shorter than arms 88 and 88A. Accordingly, one revolution of the crank pulls the arms from their solid to broken line position in FIGURE 5 and then pushes them back again to the solid line position. Closure 93 is thus moved radially and longitudinally from the solid line closed position to the broken line open position and back. As the closure member 93 is pushed back to its closed (solid lines in FIGURE 5) position, it carries the lever 122 away from clutch lever 132. Spring 142 holds the clutch lever against sleeve 74 and cable 126 will pull trip lever 122 upright in preparation for a new cycle, plate 102 having in the meantime fallen to a vertical position as the feed is dumped through opening 34. The clutch will remain disengaged and closure member 93 remains closed until the auger again forces feed to pivot pressure plate 102 to the broken line position of FIGURE 4 to repeat the cycle.

When the closure member 93 moves away from the opening 34 to the dotted line position of FIGURES 5 and 14, the feed material is allowed to fall through the opening 34 into the feed bunk B. It should be noted also that the feed at the distal end 58 of the auger A will be propelled out of the opening produced when the pressure sensing plate 102 swings to the broken line position seen in FIGURE 4 during the brief interval between the swinging of pressure plate 102 and the opening of closure gate 93.

Thus, there will be no movement of pitman 79 until such time as the feed conveyor and support means is ready to dump. Accordingly, animals nosing the feed conveying and support means will not accidentally be engaged by moving mechanism. Simultaneously, with the movement of the pitman 79, gate 93 is opening and allowing feed to drop into the bunk which will attract the animals heads down into the bunk and away from the moving machinery. In combination particularly with the completely enclosed auger described below, therefore, this structure is an exceptionally safe one relative animal injury.

Figure 11:
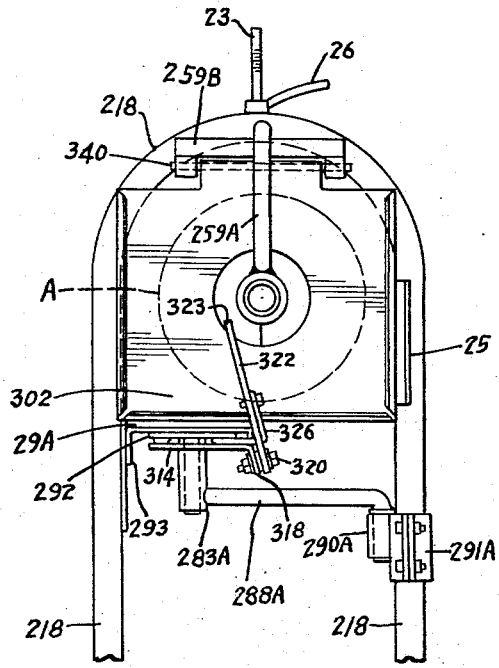
FIGURE 11 is an end elevational view of a conveyor and bunk feeder according to a modified form of the invention on the same scale as FIGURE 2; broken lines show hidden parts.
Figure 12:
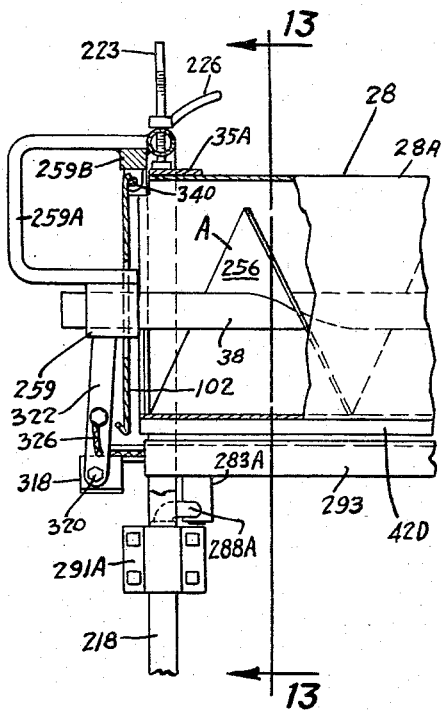
FIGURE 12 is a partial side elevational view of the conveyor of FIGURE 11 and drawn to the same scale; broken lines show hidden parts.
Figure 13:
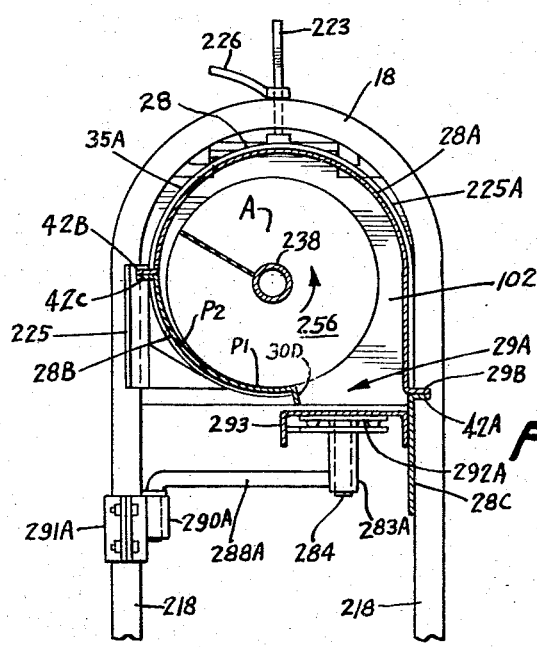
FIGURE 13 is a vertical transverse sectional view of the conveyor of FIGURE 11 taken on the line and in the direction of the arrows 13—13 of FIGURE 12; it is drawn to the same scale as FIGURES 11 and 12.

Refer now to FIGURES 11, 12 and 13 which illustrate a modified form of the invention. Much of the apparatus of FIGURES 11, 12 and 13 is identical with the apparatus of FIGURES 1 through 10 and 14 and, where substantially the same or identical, the numerals used to refer to corresponding parts in the disclosure of FIGURES 1 through 10 and 14 have been raised by two hundred to provide distinct but correlating numerals. The differences in construction between the form of the invention previously described and the apparatus of FIGURES 11, 12 and 13 are primarily in the enclosure of the auger and the support therefor, which will now be described.

The conveyor assembly 212 includes an elongated housing shroud or hood 28 which is formed of three parts, an upper cover 28A, a reversible wear plate 28B, and a curtain wall plate member 28C. Members 28A, 28B and 28C, as seen in FIGURE 3, are formed of suitable gauge sheet metal and when assembled form an exaggerated inverted J in cross section with the gap between the curved portion and vertical portion forming an elongated aperture or slot at 29A. Member 28A is bent as shown in FIGURE 13 at 29B to provide an outwardly turned flange, to which is secured an outwardly turned flange 42A of curtain wall plate member 28C. The other edge of member 28A is bent to provide an outwardly turned flange 42B to which is secured one outwardly turned flange 42C of member 28B. Member 28B comprises an elongated member having a cross section in the form of an arc of a circle with two outwardly turned parallel flanges 42C and 42D at the edges of the arc so that if there is wear due to the abrasive aciton of the auger A thereagainst at the portion indicated by P1, the member 28B may be turned end for end or reversed whereupon portion P2 would then be positioned under auger for support. The flanges 29B, 42B, 42C and 42D may be hemmed to provide additional strength, if desired. Each of the outwardly turned flanges 42B–42D and 29A–42A is provided with a plurality of aligned apertures so that curtain plate 28C may be bolted to member 28A by a plurality of longitudinally spaced bolt assemblies (not shown) and hood cover 28A may be bolted to wear plate 28B by a plurality of similar bolt assemblies. Apertures in flanges 42C and 42D correspond to the apertures in flange 42B so that when the wear plate 28B is reversed the other flange (in this instance 42D) may be bolted to flange 42B. The cross member 259B (like cross member 59B) is welded or otherwise rigidly secured directly to the closed end of the stand 218 which is similar to stand 18 but bent on a smaller radius. The lower end of bolt 223 (like bolt 23) is rigidly secured to guide member 35A, which extends around and is rigidly secured to the outward surface of the member 28A and 28B at their distal ends. The guide member 225 (like guide 25) is adapted to abut against and ride up and down the adjacent leg of stand 218. Handled nut 226 (like nut 26) engages bolt 23 and provides vertical adjustment for the conveyor assembly relative to stand 218.

It will be apparent by reference to FIGURE 13 that when the auger is rotated in a direction to roll up the arcuate incline provided by the arcuate wear plate 28B, or counterclockwise, as shown by the arrow in FIGURE 13, it will remain supported by plate 28B or return to it if forced off as by a bunch of feed for example. Cover 28A and plate 28B provide in cross section, a circle for the major portion of their combined peripheries. The circle is terminated at flange 42D. The axis of the auger is offset downwardly and toward the left with reference to the axis of the circle formed by portions 28A and 28B so that wear plate 28B cradles the auger as shown. The straight portion of cover 28A terminates in spaced relation to flange 42D to provide the opening 29A. Hence, there is a gradually increasing clearance between the circumference of the auger and the circle formed by members 28A and 28B, the clearance gradually increasing upwardly in a counterclockwise direction as shown in FIGURE 13. The edge of wear plate 28B at flange 42D is positioned at slightly past a vertical plane passed through the axis of the circle to cradle the auger when it is in the position shown. In other words, that edge of the wear plate 28B (as at 42D) is positioned at one side also of a vertical plane passed through the axis of auger A when it is at rest position, but immediately adjacent that plane. The increasing clearance provided not only allows for give or freedom of the auger within the housing 28A when bunches of material or other obstructions are encountered, but also provides the elongated slot or opening 29A.

The opening and closing cycle of the closure member 293 is carried out in the same manner as described hereinabove in connection with the apparatus described in FIGURES 1 through 10 and 14 and is not repeated. A description of any part bearing a number in excess of 200 may be found by simply deducting 200 from that number and reading the description given above for the item identified by the resulting number. Accordingly, a detailed description of pressure sensing plate 302 (like plate 102), trip lever 322 (like lever 122) and so forth is omitted to avoid burdening the file with repetition.

It is apparent that many modifications and variations of this invention as hereinabove may be made without departing from the spirit and scope thereof. The specific embodiments described are given by way of example only and the invention is limited only by the terms of the appended claims.

The embodiments of the invention in which an exclusive property or privilege is claimed are defined as follows:

1. A bunk feeder assembly comprising an extended conveyor means for transporting material into linear extension, said conveyor means having an openable closure means, drive means for moving said openable closure means into open and closed positions respectively, means for controlling the movement of said openable closure means, and a mechanical means secured between said controlling means and said drive means for initiating the connecting of said drive means with said openable closure means, said drive means includes a clutch having an external sleeve, said clutch being engaged whenever said external sleeve is free to rotate, and said controlling means comprising, a trip lever pivoted to said openable closure means adjacent its outer end, a control lever having means thereon for holding said external cylindrical member stationary when in one position, yielding means urging said control lever to said external cylindrical member holding position, an elongated mechanical member interconnecting said trip and control levers of such length that said control lever will be pulled from its external sleeve holding position when said trip lever is deflected by conveyed material and thereby moves said trip lever, said openable closure moving toward said clutch to open and away therefrom to close.

2. The structure of claim 1 in which said controlling means comprises pressure sensing means including a plate hinged to said conveyor means and forming a movable wall portion of said conveyor means at least near the end of the linear extension to which said conveyor means conveys material.

3. A bunk feeder assembly comprising a conveyor having a dumping mechanism that moves in a horizontal plane in an arcuate path to dump material moved into extended linear relation, a drive means secured to said conveyor to move said dumping mechanism in a cycle from closed to open and back to closed, a control means secured to said drive means, said control means having a cycle start position and a cycle stop position, yielding means urging said control means to its cycle stop position, a trip means secured to said dumping mechanism, a mechanical means interconnecting said trip and control means, and a means responsive to the movement of material conveyed and mechanically engaging said trip means to move it as to cause said mechanical interconnecting means to move said control means to its cycle start position, said trip means then being carried by said dumping mechanism in a direction to release said control means from said cycle start position, said yielding means then returning said control means to the cycle stop position, whereby said drive means will stop driving said dumping mechanism when its cycle is completed.

4. A bunk feeder assembly including means for conveying feed longitudinally therethrough and supporting feed in extended linear position above a feed bunk, said conveying and supporting means including two movable portions closing openings in said conveying and supporting means, one of said movable portions closing an opening and moving away from its opening in response to conveyed feed, means for driving the other of said movable portions, and actuating means interconnecting said one movable portion and said driving means, whereby the other of said movable portions is moved in response to the movement of the first movable portion.

5. The structure according to claim 4 in which said first movable portion moves in the same direction as conveyed material to provide an opening at an end of said conveying and supporting means and said other movable portion when moved causes an opening in said supporting means for movement of feed at right angles to its conveyed direction.

6. The structure according to claim 5 in which there is a feed bunk, said conveying and supporting means positioned in spaced relation to said feed bunk above it, said feed bunk being longer than said conveying and supporting means and extending beyond a vertical projection of said one movable portion.

7. An improved bunk feeder assembly including means for extending feed linearly, means for supporting linearly extended feed above a bunk, and means for dumping the feed into a bunk the improvement comprising, a dumping control including, a drive means, a clutch means secured in part to said drive means and in part to said dumping means, a clutch control means for holding the clutch means disengaged, said control means being movable from the clutch means to permit engagement of the clutch means, and means responsive to the operation of said means for linearly extending feed for moving said clutch control means from the clutch means whereby the clutch means engages to operate the means for dumping the feed.

8. The structure of claim 7 in which said drive means includes a shaft and said clutch is concentric with and supported by said drive means shaft.

9. The structure of claim 7 in which said means for extending feed linearly is an auger and said feed supporting means includes an arcuate trough portion extending under and supporting said auger.

10. The structure of claim 7 in which said means for linearly extending feed is an auger and said feed supporting means is a hood-like member enclosing said auger, said hoodlike structure including a movable portion, means for moving said movable portion radially relative to the balance of said hood-like structure to empty said hood-like structure periodically.

11. An improved bunk feeder assembly including means for extending feed linearly, means for supporting linearly extending feed above a bunk, and means for dumping the feed into a bunk the improvement comprising: a dumping control including, a drive means, a clutch means secured in part of said drive means and in part to said dumping means, a clutch control means for engaging and disengaging the clutch means, means responsive to the operation of said means for linearly extending feed for actuating said clutch control means and engaging said clutch means, said means responsive to linearly extended feed comprises means physically moved by linearly extended feed, a trip lever freely pivoted to said dumping means engaged by said means physically moved by linearly extended feed, and a cable interconnecting said trip lever and said clutch control.

12. The structure of claim 11 in which said means physically moved by said linearly extended feed comprises a hinged plate forming a portion of said supporting means and, when moved to actuate said dumping means control, opening said supporting for the egress of feed in the direction in which said extending means extends feed.

13. A feed bunk and feeder assembly therefore comprising, a bunk feeder means for conveying material into extended linear relation, means for supporting said conveying means in spaced relation above said feed bunk, said means for conveying material comprising a feed supporting means having egress means intermediate its ends, closure means for said egress means, drive means including a clutch for moving said closure means through a cycle including opening said egress means to release material into said feed bunk and returning the closure means to a position enclosing said egress means and a means for initiating said closure means responsive to the conveying of material into extended linear relation, said initiating means comprising, a hinged plate positioned at the end of the conveyor assembly defining the end of said extended linear relation, a trip lever pivotally mounted on said closure and extending into the path of hinged movement of said hinged plate, a cable means secured to said trip lever, a control lever on said drive means clutch to which said cable means is also secured, whereby said closure means cycle is initiated when said plate is hinged.

14. In a bunk feeder assembly or the like including an elongated conveying means for receiving feed and conveying it into extended relation, an elongated closure means enclosing most of said conveying means but providing an elongated egress slot, a drive motor, a clutch connected to the drive motor, a clutch control positioned near said clutch, a crank connected to the clutch, a closure mounted for movement sealing and opening said egress slot selectively and connected to said crank, sensing means at the end of the conveying means distant from its receiving end, an elongated flexible connecting means secured between said clutch control and said sensing means for engaging said clutch when said sensing means is deflected and a means operatively associated with said clutch control for disengaging the clutch when the closure is moved from an open position to a position sealing said egress slot.

15. The structure of claim 14 further characterized in that a journal is provided at the distal of said elongated enclosure, said conveying means is at least partially supported for rotation by said journal and said pressure sensing means comprises a movable plate having an opening therein to receive said journal; said movable plate yielding to open the distal end of said elongated enclosure when conveyed feed engages it.

16. The apparatus according to claim 14 wherein said pressure sensing means and said connecting means comprise a plate pivotally mounted at the end of said conveying means with the lower and adapted to be deflected outward, a trip lever mounted upon the end of the closure and extending upwardly therefrom into the path of said plate, a clutch engaging lever, a cable connected between said trip and clutch engaging levers; whereby outward movement of the plate will engage the clutch.

17. The apparatus of claim 16 wherein a spring is secured to the clutch operating lever for returning the operating lever to the clutch disengaging position when the tension on the cable is released to thereby disengage the clutch when the closure is returned to a position sealing said egress slot, said closure moving toward said clutch to relieve tension on said cable when said closure opens.

18. A bunk feeder assembly comprising, an elongated enclosure having an open end and a longitudinal bottom slot, an auger rotatably supported within said elongated enclosure, means for rotating said auger to cause it to convey feed to said elongated enclosure open end, a plate hinged to said elongated enclosure and covering the open end thereof, means secured to said elongated enclosure for supporting it in an elevated position above a surface, a gate means swingably supported adjacent to said elongated enclosure bottom slot and movable under and away from the slot selectively, gate drive means including a clutch at the end of said enclosure remote from its open end, a crank secured to said clutch, a pitman connecting said crank and said gate, an external sleeve on said clutch, said clutch being engaged whenever said external sleeve is free to rotate, a control lever pivoted to said drive means, a spring secured to said control lever and said drive means urging said control lever and said drive means urging said control lever against said external sleeve, cooperating means on said external sleeve and said control lever that engage each other when said sleeve is in a given position and said lever is engaging it; whereby said external sleeve is held against rotation, a trip lever pivoted to said gate on an axis that places its end remote from said gate in the path of said plate when said trip lever is pivoted to a vertical position, a cable secured to said trip lever and said control lever; whereby when feed is conveyed against said plate by said auger, said plate hingedly moved away from said auger and engages said trip lever forcing it down from a vertical position; whereby said control lever is pulled away from said external sleeve by said cable and said cooperating means are disengaged; whereupon said clutch engages and moves said crank initially away from said enclosure and thus pulls said gate via said pitman away from said slot; said trip lever moving with said gate toward said control lever and thereby relieving tension on said cable; whereby said control lever returns to its external sleeve engaging position; whereby said cooperating means engage each other when said crank returns to its original position; said hinged plate hinging back to close said elongated enclosure open end when said gate opens said slot and empties said elongated enclosure and said gate upon returning to the closed position moving said trip lever away from said control lever; whereby said cable pulls said trip lever to a vertical position.

References Cited by the Examiner
UNITED STATES PATENTS

| | | | |
|---|---|---|---|
| 2,536,621 | 1/1951 | Arnold | 119—21 |
| 2,646,023 | 7/1953 | Virgil | 119—52 |
| 2,795,313 | 6/1957 | Hazen | 198—60 |
| 2,961,126 | 11/1960 | Craig | 222—14 |
| 2,981,402 | 4/1961 | Cleaveland | 198—213 |
| 3,026,845 | 3/1962 | Winter | 119—51.11 |
| 3,139,862 | 7/1964 | Rutten et al. | 119—56 |
| 3,163,334 | 12/1964 | Blanshine | 222—412 |

ALDRICH F. MEDBERY, *Acting Primary Examiner.*